(12) United States Patent
Palmer et al.

(10) Patent No.: US 9,858,242 B2
(45) Date of Patent: Jan. 2, 2018

(54) MEMORY CONTROLLER FOR A NETWORK ON A CHIP DEVICE

(71) Applicant: KnuEdge Incorporated, San Diego, CA (US)

(72) Inventors: Douglas A. Palmer, San Diego, CA (US); Ramon Zuniga, San Diego, CA (US)

(73) Assignee: KnuEdge Incorporated, San Diego, CA (US)

( * ) Notice: Subject to any disclaimer, the term of this patent is extended or adjusted under 35 U.S.C. 154(b) by 0 days.

(21) Appl. No.: 15/369,954

(22) Filed: Dec. 6, 2016

(65) Prior Publication Data

US 2017/0083477 A1    Mar. 23, 2017

Related U.S. Application Data

(63) Continuation of application No. 14/608,515, filed on Jan. 29, 2015, now Pat. No. 9,552,327.

(51) Int. Cl.
*G06F 13/00* (2006.01)
*G06F 15/78* (2006.01)
(Continued)

(52) U.S. Cl.
CPC ...... *G06F 15/7825* (2013.01); *G06F 13/1657* (2013.01); *G06F 13/1694* (2013.01);
(Continued)

(58) Field of Classification Search
CPC .. G06F 13/1657; G06F 13/1694; G06F 13/28; G06F 13/4234; G06F 15/7821;
(Continued)

(56) References Cited

U.S. PATENT DOCUMENTS

| 4,797,652 A | 1/1989 | Hall |
| 4,860,201 A | 8/1989 | Stolfo et al. |

(Continued)

FOREIGN PATENT DOCUMENTS

| WO | 1992002866 | 2/1992 |
| WO | 1993020552 | 10/1993 |

(Continued)

OTHER PUBLICATIONS

Kim et al. "Mapping of Neural Networks onto the Memory-Processor Integrated Architecture" Neural Networks vol. 11 No. 6 Aug. 1998 pp. 1083-1098 (20 pages).

(Continued)

*Primary Examiner* — Yong Choe
(74) *Attorney, Agent, or Firm* — Fish & Richardson P.C.

(57) ABSTRACT

Systems and methods may be provided to support memory access by packet communication and/or direct memory access. In one aspect, a memory controller may be provided for a processing device containing a plurality of computing resources. The memory controller may comprise a first interface to be coupled to a router. The first interface may be configured to transmit and receive packets. Each packet may comprise a header that may contain a routable address and a packet opcode specifying an operation to be performed in accordance with a network protocol. The memory controller may further comprise a memory bus port coupled to a plurality of memory slots that are configured to receive memory banks to form a memory and a controller core coupled to the first interface. The controller core may be configured to decode a packet received at the first interface and perform an operation specified in the received packet.

20 Claims, 13 Drawing Sheets

(51) Int. Cl.
  *G06F 13/16*   (2006.01)
  *H04L 12/717*  (2013.01)
  *G06F 13/28*   (2006.01)
  *G06F 13/42*   (2006.01)
  *H04L 12/741*  (2013.01)
  *H04L 12/715*  (2013.01)
  *H04L 12/933*  (2013.01)

(52) U.S. Cl.
  CPC .......... *G06F 13/28* (2013.01); *G06F 13/4234* (2013.01); *G06F 15/7821* (2013.01); *H04L 45/42* (2013.01); *H04L 45/74* (2013.01); *H04L 45/46* (2013.01); *H04L 49/109* (2013.01)

(58) Field of Classification Search
  CPC ..... G06F 15/7825; H04L 45/42; H04L 45/46; H04L 45/74; H04L 49/109
  See application file for complete search history.

(56) References Cited

U.S. PATENT DOCUMENTS

| | | | |
|---|---|---|---|
| 4,974,169 | A | 11/1990 | Engel |
| 5,161,156 | A | 11/1992 | Baum et al. |
| 5,224,100 | A | 6/1993 | Lee et al. |
| 5,285,524 | A | 2/1994 | Cok |
| 5,325,464 | A | 6/1994 | Pechanek et al. |
| 6,085,233 | A | 7/2000 | Jeffrey et al. |
| 6,513,108 | B1 | 1/2003 | Kerr et al. |
| 6,735,773 | B1 | 5/2004 | Trinh et al. |
| 6,917,915 | B2 | 7/2005 | Du et al. |
| 6,965,615 | B1 | 11/2005 | Kerr et al. |
| 7,401,169 | B2 | 7/2008 | Holbrook |
| 7,685,409 | B2 | 3/2010 | Due et al. |
| 7,746,862 | B1 | 6/2010 | Zuk et al. |
| 8,126,828 | B2 | 2/2012 | Snook et al. |
| 8,583,648 | B1 | 11/2013 | Majkowska |
| 8,655,815 | B2 | 2/2014 | Palmer et al. |
| 8,848,726 | B1 | 9/2014 | Palmer |
| 8,954,700 | B2 | 2/2015 | Ansari et al. |
| 9,185,057 | B2 | 11/2015 | Palmer et al. |
| 2002/0073348 | A1 | 6/2002 | Tani |
| 2002/0083297 | A1 | 6/2002 | Modelski et al. |
| 2003/0037194 | A1 | 2/2003 | Mukherjee |
| 2003/0231627 | A1 | 12/2003 | John et al. |
| 2004/0030745 | A1 | 2/2004 | Boucher et al. |
| 2004/0037322 | A1 | 2/2004 | Sukonik et al. |
| 2004/0098490 | A1 | 5/2004 | Dinker et al. |
| 2005/0204058 | A1 | 9/2005 | Philbrick et al. |
| 2006/0010144 | A1 | 1/2006 | Lawrence et al. |
| 2006/0023719 | A1 | 2/2006 | Sindhu et al. |
| 2007/0011118 | A1 | 1/2007 | Snook et al. |
| 2007/0022063 | A1 | 1/2007 | Lightowler |
| 2007/0121499 | A1 | 5/2007 | Pal et al. |
| 2008/0215514 | A1 | 9/2008 | Morgan |
| 2010/0095088 | A1 | 4/2010 | Vorbach |
| 2010/0161533 | A1 | 6/2010 | Snook |
| 2010/0269027 | A1 | 10/2010 | Arimilli et al. |
| 2010/0312735 | A1 | 12/2010 | Knoblauch |
| 2011/0083000 | A1 | 4/2011 | Rhoades et al. |
| 2011/0161625 | A1 | 6/2011 | Pechanek |
| 2011/0219035 | A1 | 9/2011 | Korsunsky et al. |
| 2011/0261705 | A1 | 10/2011 | Kamerkar et al. |
| 2011/0289034 | A1 | 11/2011 | Palmer et al. |
| 2011/0313961 | A1 | 12/2011 | Toscano et al. |
| 2012/0066372 | A1 | 3/2012 | Jennings et al. |
| 2012/0075319 | A1 | 3/2012 | Dally |
| 2012/0177050 | A1* | 7/2012 | Fujimoto ............ G06F 12/0661 370/392 |
| 2012/0179896 | A1 | 7/2012 | Salapura et al. |
| 2012/0240185 | A1 | 9/2012 | Kapoor et al. |
| 2012/0320921 | A1 | 12/2012 | Barnes et al. |
| 2014/0032457 | A1 | 1/2014 | Palmer et al. |
| 2014/0156907 | A1 | 6/2014 | Palmer |
| 2014/0172763 | A1 | 6/2014 | Palmer et al. |
| 2014/0281429 | A1 | 9/2014 | Brown et al. |
| 2014/0304399 | A1 | 10/2014 | Chaudhary et al. |
| 2014/0310467 | A1 | 10/2014 | Shalf et al. |
| 2015/0124805 | A1 | 5/2015 | Yadav et al. |

FOREIGN PATENT DOCUMENTS

| | | |
|---|---|---|
| WO | WO2004042570 A1 | 5/2004 |
| WO | 2014062265 | 4/2014 |
| WO | 2014089259 | 6/2014 |

OTHER PUBLICATIONS

Schaefer et al. "Simulation of Spiking Neural Networks Architectures and Implementations" Neurocomputing vol. 48 2002 pp. 647-679 (33 pages).

Frank et al. "An Accelerator for Neural Networks with Pulse-Coded Model Neurons" IEEE Transactions on Neural Networks vol. 10 No. 3 May 1999 pp. 527-538 (12 pages).

Rast et al. "Virtual Synaptic Interconnect Using an Asynchronous Network-On-Chip" Proceedings of the 2008 IEEE International Joint Conference on Neural Networks Jun. 1 2008 pp. 2727-2734 (8 pages).

Purnaprajna et al. "Using Run-Time Reconfiguration for Energy Savings in Parallel Data Processing" Proceedings of the International Conference on Engineering of Reconfigurable Systems and Algorithms Jul. 13 2009 7 pages.

Eichner et al. "Neural Simulations on Multi-Core Architectures" Frontiers in Neuroinformatics vol. 3 Article. Jul. 21, 2009 p. 1-15.

Extended European Search Report and Opinion dated Nov. 6, 2013 for corresponding EP application 11783883.9 7 pages.

International Search Report and Written Opinion for International Application No. PCT/US2016/015078, dated May 18, 2016.

International Application No. PCT/US2016/015483, Notification of Transmittal of the International Search Report and the Written Opinion of the International Searching Authority, dated Apr. 28, 2016, 23 pages.

\* cited by examiner

100A

100B

MEMORY CONTROLLER FOR A NETWORK ON A CHIP DEVICE

CROSS-REFERENCE TO RELATED APPLICATIONS

The present application is a continuation of U.S. patent application Ser. No. 14/608,515, filed Jan. 29, 2015, and entitled "Memory Controller for a Network on a Chip Device," which is hereby incorporated herein by reference in its entirety.

FIELD OF THE DISCLOSURE

The systems, methods and apparatuses described herein relate to a memory controller for a processing device that has a plurality of computing resources.

BACKGROUND

Memory is a crucial part of most typical computers. Most memories, especially dynamic random access memories (RAMs), use relatively complex bus protocols for communication. Most memory designs also assume that the memory will be connected directly to exactly one host (e.g., a "North Bridge"). All writes come from that host, and data from all reads go to that host. If more than one destination for data is possible, logic at some higher level must determine the destination for the data, and send that data to the appropriate destination.

This complex protocol and limitation to a single host connection limit flexibility in using memory. These limitations become particularly apparent when using memory in a network on a chip processing device.

SUMMARY

The present disclosure provides systems, methods and apparatuses for operating a computing system. In one aspect of the disclosure, a memory controller may be provided for a processing device containing a plurality of computing resources. The memory controller may comprise a first interface to couple the memory controller to a router. The first interface may be configured to transmit and receive packets that each may comprise a header. The header may contain a routable address and a packet opcode specifying an operation to be performed in accordance with a network protocol. The memory controller may further comprise a memory bus port coupled to a plurality of memory slots. The memory slots may be configured to receive memory banks to form a memory associated with the memory controller. Furthermore, the memory controller may comprise a controller core coupled to the first interface. The controller core may be configured to decode a packet received at the first interface and perform an operation specified in the received packet.

In another aspect of the disclosure, a processing device may comprise a top level router that has a plurality of high speed communication interfaces to communicate data to other devices external of the processing device, a device controller coupled to the top level router to control operation of the top level router and a plurality of clusters of processing engines. Each cluster may have a cluster controller, one or more cluster memories each having a memory controller, and a plurality of processing engine. The memory controller for at least one of the one or more cluster memories may be a smart memory controller that may comprises a first interface to be coupled to a router, a memory bus port coupled to a plurality of memory slots, and a controller core coupled to the first interface. The first interface may be configured to transmit and receive packets that each may comprise a header. The header may contain a routable address and a packet opcode specifying an operation to be performed in accordance with a network protocol. The memory slots may be configured to receive memory banks to form a memory associated with the smart memory controller. The controller core may be configured to: decode a packet received at the first interface and perform an operation specified in the received packet. The device controller, each cluster controller, all memory controllers other than the smart memory controller and all processing engines in clusters other than the cluster in which the smart memory controller is located may be configured to address any memory location in the memory associated with the smart memory controller using the packets.

In yet another aspect, a method may be provided for operating a memory controller for a processing device that may comprise a plurality of computing resources. The method may comprise receiving a packet on a first interface of the memory controller. The first interface may be coupled to a router and configured to transmit and receive packets that each may comprise a header. The header may contain a routable address and a packet opcode specifying an operation to be performed in accordance with a network protocol. The method may further comprise decoding the received packet to determine a memory address to be accessed and an operation specified in the received packet and performing the operation specified in the received packet. The memory address may point to a memory location in a memory associated with the memory controller and the operation may be specified by the packet opcode.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Certain illustrative aspects of the systems, apparatuses, and methods according to the present invention are described herein in connection with the following description and the accompanying figures. These aspects are indicative, however, of but a few of the various ways in which the principles of the invention may be employed and the present invention is intended to include all such aspects and their equivalents. Other advantages and novel features of the invention may become apparent from the following detailed description when considered in conjunction with the figures.

In the following detailed description, numerous specific details are set forth in order to provide a thorough understanding of the invention. In other instances, well known structures, interfaces, and processes have not been shown in detail in order to avoid unnecessarily obscuring the invention. However, it will be apparent to one of ordinary skill in the art that those specific details disclosed herein need not be used to practice the invention and do not represent a limitation on the scope of the invention, except as recited in the claims. It is intended that no part of this specification be construed to effect a disavowal of any part of the full scope of the invention. Although certain embodiments of the present disclosure are described, these embodiments likewise are not intended to limit the full scope of the invention.

Figure 1A:
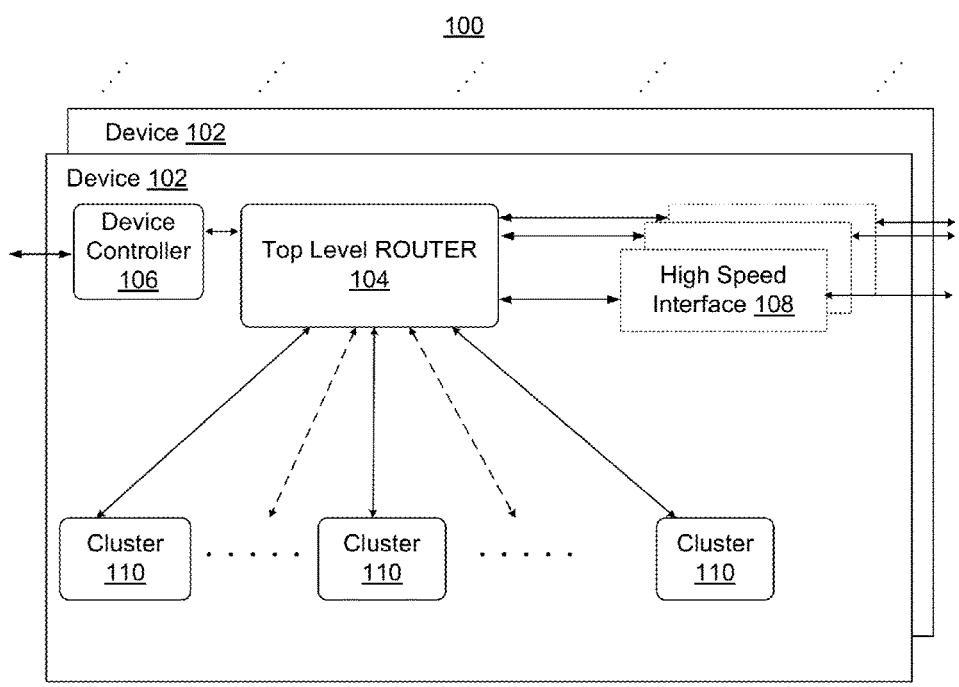
FIG. 1A is a block diagram of an exemplary computing system according to the present disclosure.

FIG. 1A shows an exemplary computing system 100 according to the present disclosure. The computing system 100 may comprise at least one processing device 102. A typical computing system 100, however, may comprise a plurality of processing devices 102. Each processing device 102, which may also be referred to as device 102, may comprise a router 104, a device controller 106, a plurality of high speed interfaces 108 and a plurality of clusters 110. The router 104 may also be referred to as a top level router or a level one router. Each cluster 110 may comprise a plurality of processing engines to provide computational capabilities for the computing system 100. The high speed interfaces 108 may comprise communication ports to communicate data outside of the device 102, for example, to other devices 102 of the computing system 100 and/or interfaces to other computing systems. Unless specifically expressed otherwise, data as used herein may refer to both program code and pieces of information upon which the program code operates.

In some implementations, the processing device 102 may include 2, 4, 8, 16, 32 or another number of high speed interfaces 108. Each high speed interface 108 may implement a physical communication protocol. In one non-limiting example, each high speed interface 108 may implement the media access control (MAC) protocol, and thus may have a unique MAC address associated with it. The physical communication may be implemented in a known communication technology, for example, Gigabit Ethernet, or any other existing or future-developed communication technology. In one non-limiting example, each high speed interface 108 may implement bi-directional high-speed serial ports, such as 10 Giga bits per second (Gbps) serial ports. Two processing devices 102 implementing such high speed interfaces 108 may be directly coupled via one pair or multiple pairs of the high speed interfaces 108, with each pair comprising one high speed interface 108 on one processing device 102 and another high speed interface 108 on the other processing device 102.

Figure 5:
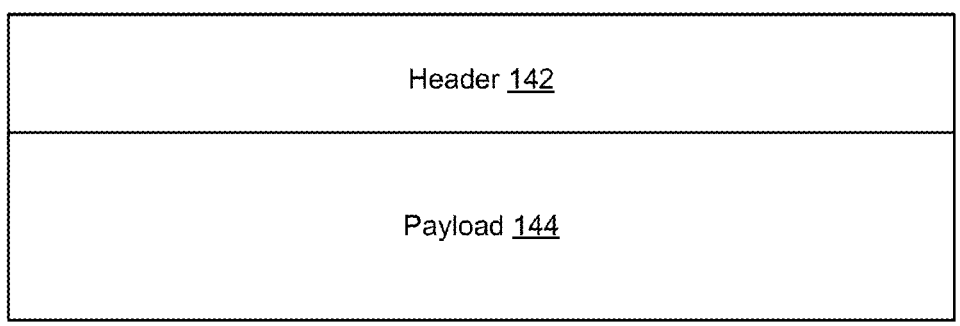
FIG. 5 is a block diagram of an exemplary packet according to the present disclosure.

Data communication between different computing resources of the computing system 100 may be implemented using routable packets. The computing resources may comprise device level resources such as a device controller 106, cluster level resources such as a cluster controller or cluster memory controller, and/or the processing engine level resources such as individual processing engines and/or individual processing engine memory controllers. An exemplary packet 140 according to the present disclosure is shown in FIG. 5. The packet 140 may comprise a header 142 and a payload 144. The header 142 may include a routable destination address for the packet 140. The router 104 may be a top-most router configured to route packets on each processing device 102. The router 104 may be a programmable router. That is, the routing information used by the router 104 may be programmed and updated. In one non-limiting embodiment, the router 104 may be implemented using an address resolution table (ART) or Look-up table (LUT) to route any packet it receives on the high speed interfaces 108, or any of the internal interfaces interfacing the device controller 106 or clusters 110. For example, depending on the destination address, a packet 140 received from one cluster 110 may be routed to a different cluster 110 on the same processing device 102, or to a different processing device 102; and a packet 140 received from one high speed interface 108 may be routed to a cluster 110 on the processing device or to a different processing device 102.

The device controller 106 may control the operation of the processing device 102 from power on through power down. The device controller 106 may comprise a device controller processor, one or more registers and a device controller memory space. The device controller processor may be any existing or future-developed microcontroller. In one embodiment, for example, an ARM® Cortex M0 microcontroller may be used for its small footprint and low power consumption. In another embodiment, a bigger and more powerful microcontroller may be chosen if needed. The one or more registers may include one to hold a device identifier (DEVID) for the processing device 102 after the processing device 102 is powered up. The DEVID may be used to uniquely identify the processing device 102 in the computing system 100. In one non-limiting embodiment, the DEVID may be loaded on system start from a non-volatile storage, for example, a non-volatile internal storage on the processing device 102 or a non-volatile external storage. The device controller memory space may include both read-only memory (ROM) and random access memory (RAM). In one non-limiting embodiment, the ROM may store bootloader code that during a system start may be executed to initialize the processing device 102 and load the remainder of the boot code through a bus from outside of the device controller 106. The instructions for the device controller processor, also referred to as the firmware, may reside in the RAM after they are loaded during the system start.

The registers and device controller memory space of the device controller 106 may be read and written to by computing resources of the computing system 100 using packets. That is, they are addressable using packets. As used herein, the term "memory" may refer to RAM, SRAM, DRAM, eDRAM, SDRAM, volatile memory, non-volatile memory, and/or other types of electronic memory. For example, the header of a packet may include a destination address such as DEVID:PADDR, of which the DEVID may identify the processing device 102 and the PADDR may be an address for a register of the device controller 106 or a memory location of the device controller memory space of a processing device 102. In some embodiments, a packet directed to the device controller 106 may have a packet operation code, which may be referred to as packet opcode or just opcode to indicate what operation needs to be performed for the packet. For example, the packet operation code may indicate reading from or writing to the storage location pointed to by PADDR. It should be noted that the device controller 106 may also send packets in addition to receiving them. The packets sent by the device controller 106 may be self-initiated or in response to a received packet (e.g., a read request). Self-initiated packets may include for example, reporting status information, requesting data, etc.

Figure 1B:
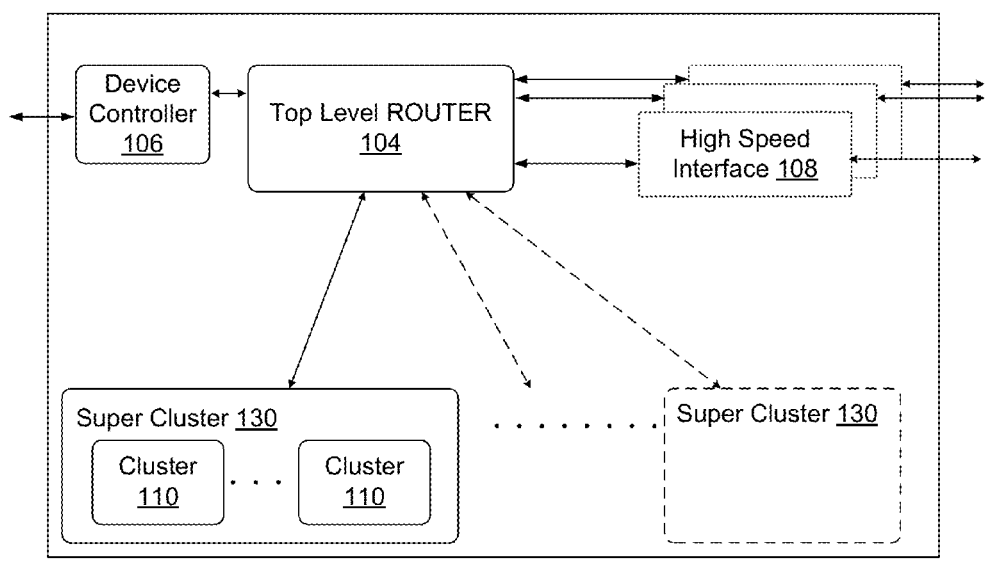
FIG. 1B is a block diagram of an exemplary processing device according to the present disclosure.

In one embodiment, a plurality of clusters 110 on a processing device 102 may be grouped together. FIG. 1B shows a block diagram of another exemplary processing device 102A according to the present disclosure. The exemplary processing device 102A is one particular embodiment of the processing device 102. Therefore, the processing device 102 referred to in the present disclosure may include any embodiments of the processing device 102, including the exemplary processing device 102A. As shown on FIG. 1B, a plurality of clusters 110 may be grouped together to form a super cluster 130 and an exemplary processing device 102A may comprise a plurality of such super clusters 130. In one embodiment, a processing device 102 may include 2, 4, 8, 16, 32 or another number of clusters 110, without further grouping the clusters 110 into super clusters. In another embodiment, a processing device 102 may include 2, 4, 8, 16, 32 or another number of super clusters 130 and each super cluster 130 may comprise a plurality of clusters.

Figure 2A:
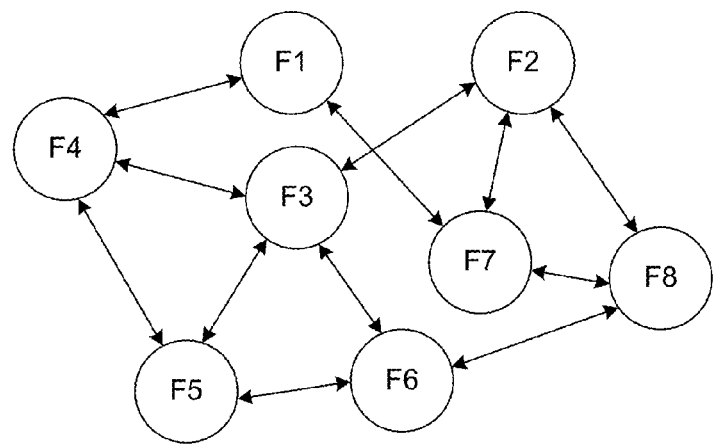
FIG. 2A is a block diagram of topology of connections of an exemplary computing system according to the present disclosure.

FIG. 2A shows a block diagram of an exemplary computing system 100A according to the present disclosure. The computing system 100A may be one exemplary embodiment of the computing system 100 of FIG. 1A. The computing system 100A may comprise a plurality of processing devices 102 designated as F1, F2, F3, F4, F5, F6, F7 and F8. As shown in FIG. 2A, each processing device 102 may be directly coupled to one or more other processing devices 102. For example, F4 may be directly coupled to F1, F3 and F5; and F7 may be directly coupled to F1, F2 and F8. Within computing system 100A, one of the processing devices 102 may function as a host for the whole computing system 100A. The host may have a unique device ID that every processing devices 102 in the computing system 100A recognizes as the host. For example, any processing devices 102 may be designated as the host for the computing system 100A. In one non-limiting example, F1 may be designated as the host and the device ID for F1 may be set as the unique device ID for the host.

In another embodiment, the host may be a computing device of a different type, such as a computer processor known in the art (for example, an ARM® Cortex or Intel® x86 processor) or any other existing or future-developed processors. In this embodiment, the host may communicate with the rest of the system 100A through a communication interface, which may represent itself to the rest of the system 100A as the host by having a device ID for the host.

The computing system 100A may implement any appropriate techniques to set the DEVIDs, including the unique DEVID for the host, to the respective processing devices 102 of the computing system 100A. In one exemplary embodiment, the DEVIDs may be stored in the ROM of the respective device controller 106 for each processing devices 102 and loaded into a register for the device controller 106 at power up. In another embodiment, the DEVIDs may be loaded from an external storage. In such an embodiment, the assignments of DEVIDs may be performed offline, and may be changed offline from time to time or as appropriate. Thus, the DEVIDs for one or more processing devices 102 may be different each time the computing system 100A initializes. Moreover, the DEVIDs stored in the registers for each device controller 106 may be changed at runtime. This runtime change may be controlled by the host of the computing system 100A. For example, after the initialization of the computing system 100A, which may load the pre-configured DEVIDs from ROM or external storage, the host of the computing system 100A may reconfigure the computing system 100A and assign different DEVIDs to the processing devices 102 in the computing system 100A to overwrite the initial DEVIDs in the registers of the device controllers 106.

Figure 2B:
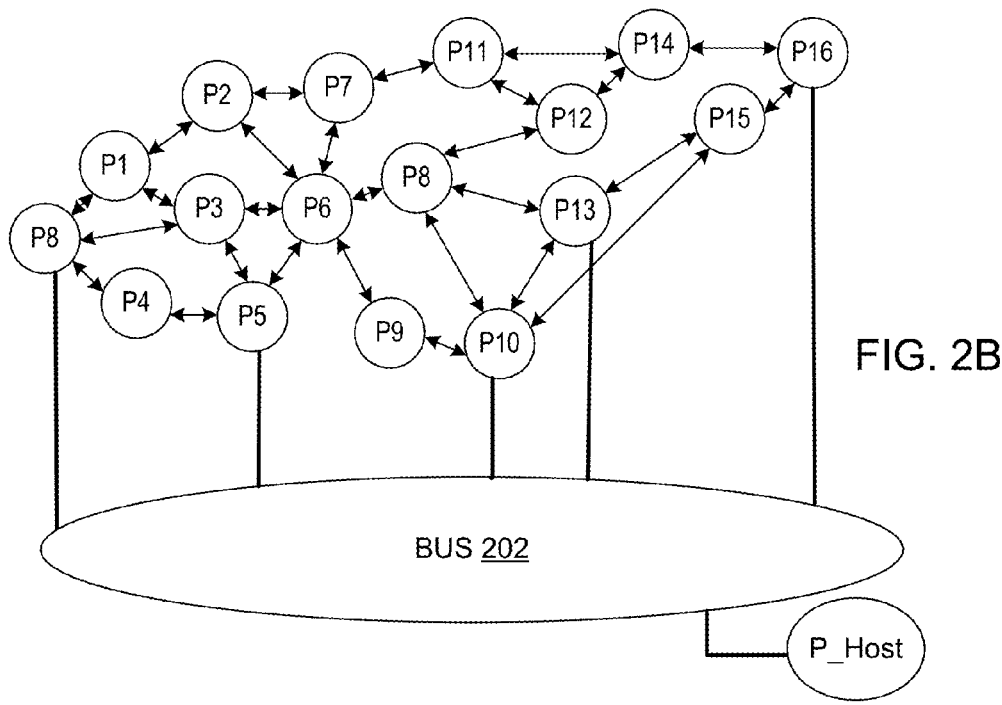
FIG. 2B is a block diagram of topology of connections of another exemplary computing system according to the present disclosure.

FIG. 2B is a block diagram of a topology of another exemplary system 100B according to the present disclosure. The computing system 100B may be another exemplary embodiment of the computing system 100 of FIG. 1 and may comprise a plurality of processing devices 102 (designated as P1 through P16 on FIG. 2B), a bus 202 and a processing device P_Host. Each processing device of P1 through P16 may be directly coupled to another processing device of P1 through P16 by a direct link between them. At least one of the processing devices P1 through P16 may be coupled to the bus 202. As shown in FIG. 2B, the processing devices P8, P5, P10, P13, P15 and P16 may be coupled to the bus 202. The processing device P_Host may be coupled to the bus 202 and may be designated as the host for the computing system 100B. In the exemplary system 100B, the host may be a computer processor known in the art (for example, an ARM® Cortex or Intel® x86 processor) or any other existing or future-developed processors. The host may communicate with the rest of the system 100B through a communication interface coupled to the bus and may represent itself to the rest of the system 100B as the host by having a device ID for the host.

Figure 3A:
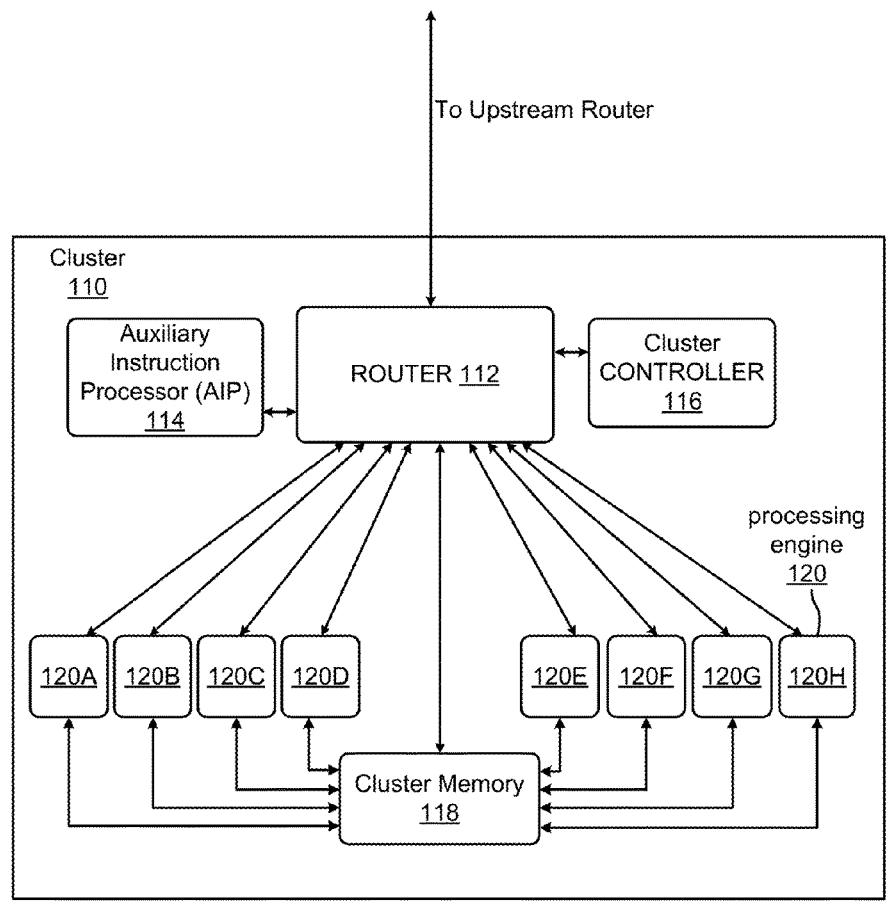
FIG. 3A is a block diagram of an exemplary cluster according to the present disclosure.

FIG. 3A shows a block diagram of an exemplary cluster 110 according to the present disclosure. The exemplary cluster 110 may comprise a router 112, a cluster controller 116, an auxiliary instruction processor (AIP) 114, a cluster memory 118 and a plurality of processing engines 120. The router 112 may be coupled to an upstream router to provide interconnection between the upstream router and the cluster 110. The upstream router may be, for example, the router 104 of the processing device 102 if the cluster 110 is not part of a super cluster 130.

The exemplary operations to be performed by the router 112 may include receiving a packet destined for a resource within the cluster 110 from outside the cluster 110 and/or transmitting a packet originating within the cluster 110 destined for a resource inside or outside the cluster 110. A resource within the cluster 110 may be, for example, the cluster memory 118 or any of the processing engines 120 within the cluster 110. A resource outside the cluster 110 may be, for example, a resource in another cluster 110 of the computer device 102, the device controller 106 of the processing device 102, or a resource on another processing device 102. In some embodiments, the router 112 may also transmit a packet to the router 104 even if the packet may target a resource within itself. In one embodiment, the router 104 may implement a loopback path to send the packet back to the originating cluster 110 if the destination resource is within the cluster 110.

The cluster controller 116 may send packets, for example, as a response to a read request, or as unsolicited data sent by hardware for error or status report. The cluster controller 116 may also receive packets, for example, packets with opcodes to read or write data. In one embodiment, the cluster controller 116 may be any existing or future-developed microcontroller, for example, one of the ARM® Cortex-M microcontroller and may comprise one or more cluster control registers (CCRs) that provide configuration and control of the cluster 110. In another embodiment, instead of using a microcontroller, the cluster controller 116 may be custom made to implement any functionalities for handling packets and controlling operation of the router 112. In such an embodiment, the functionalities may be referred to as custom logic and may be implemented, for example, by FPGA or other specialized circuitry. Regardless of whether it is a microcontroller or implemented by custom logic, the cluster controller 116 may implement a fixed-purpose state machine encapsulating packets and memory access to the CCRs.

Each cluster memory 118 may be part of the overall addressable memory of the computing system 100. That is, the addressable memory of the computing system 100 may include the cluster memories 118 of all clusters of all devices 102 of the computing system 100. The cluster memory 118 may be a part of the main memory shared by the computing system 100. In some embodiments, any memory location within the cluster memory 118 may be addressed by any processing engine within the computing system 100 by a physical address. The physical address may be a combination of the DEVID, a cluster identifier (CLSID) and a physical address location (PADDR) within the cluster memory 118, which may be formed as a string of bits, such as, for example, DEVID:CLSID:PADDR. The DEVID may be associated with the device controller 106 as described above and the CLSID may be a unique identifier to uniquely identify the cluster 110 within the local processing device 102. It should be noted that in at least some embodiments, each register of the cluster controller 116 may also be assigned a physical address (PADDR). Therefore, the physical address DEVID:CLSID:PADDR may also be used to address a register of the cluster controller 116, in which PADDR may be an address assigned to the register of the cluster controller 116.

In some other embodiments, any memory location within the cluster memory 118 may be addressed by any processing engine within the computing system 100 by a virtual address. The virtual address may be a combination of a DEVID, a CLSID and a virtual address location (ADDR), which may be formed as a string of bits, such as, for example, DEVID:CLSID:ADDR. The DEVID and CLSID in the virtual address may be the same as in the physical addresses.

In one embodiment, the width of ADDR may be specified by system configuration. For example, the width of ADDR may be loaded into a storage location convenient to the cluster memory 118 during system start and/or changed from time to time when the computing system 100 performs a system configuration. To convert the virtual address to a physical address, the value of ADDR may be added to a base physical address value (BASE). The BASE may also be specified by system configuration as the width of ADDR and stored in a location convenient to a memory controller of the cluster memory 118. In one example, the width of ADDR may be stored in a first register and the BASE may be stored in a second register in the memory controller. Thus, the virtual address DEVID:CLSID:ADDR may be converted to a physical address as DEVID:CLSID:ADDR+BASE. Note that the result of ADDR+BASE has the same width as the longer of the two.

The address in the computing system 100 may be 8 bits, 16 bits, 32 bits, 64 bits, or any other number of bits wide. In one non-limiting example, the address may be 32 bits wide. The DEVID may be 10, 15, 20, 25 or any other number of bits wide. The width of the DEVID may be chosen based on the size of the computing system 100, for example, how many processing devices 102 the computing system 100 has or may be designed to have. In one non-limiting example, the DEVID may be 20 bits wide and the computing system 100 using this width of DEVID may contain up to $2^{20}$ processing devices 102. The width of the CLSID may be chosen based on how many clusters 110 the processing device 102 may be designed to have. For example, the CLSID may be 3, 4, 5, 6, 7, 8 bits or any other number of bits wide. In one non-limiting example, the CLSID may be 5 bits wide and the processing device 102 using this width of CLSID may contain up to $2^5$ clusters. The width of the PADDR for the cluster level may be 20, 30 or any other number of bits. In one non-limiting example, the PADDR for the cluster level may be 27 bits and the cluster 110 using this width of PADDR may contain up to $2^{27}$ memory locations and/or addressable registers. Therefore, in some embodiments, if the DEVID may be 20 bits wide, CLSID may be 5 bits and PADDR may have a width of 27 bits, a physical address DEVID:CLSID:PADDR or DEVID:CLSID:ADDR+BASE may be 52 bits.

For performing the virtual to physical memory conversion, the first register (ADDR register) may have 4, 5, 6, 7 bits or any other number of bits. In one non-limiting example, the first register may be 5 bits wide. If the value of the 5 bits register is four (4), the width of ADDR may be 4 bits; and if the value of 5 bits register is eight (8), the width of ADDR will be 8 bits. Regardless of ADDR being 4 bits or 8 bits wide, if the PADDR for the cluster level may be 27 bits then BASE may be 27 bits, and the result of ADDR+BASE may still be a 27 bits physical address within the cluster memory 118.

FIG. 3A shows that a cluster 110 may comprise one cluster memory 118. In another embodiment, a cluster 110 may comprise a plurality of cluster memories 118 that each may comprise a memory controller and a plurality of memory banks, respectively. Moreover, in yet another embodiment, a cluster 110 may comprise a plurality of cluster memories 118 and these cluster memories 118 may be connected together via a router that may be downstream of the router 112.

The AIP 114 may be a special processing engine shared by all processing engines 120 of one cluster 110. In one example, the AIP 114 may be implemented as a coprocessor to the processing engines 120. For example, the AIP 114 may implement less commonly used instructions such as some floating point arithmetic, including but not limited to, one or more of addition, subtraction, multiplication, division and square root, etc. As shown in FIG. 3A, the AIP 114 may be coupled to the router 112 directly and may be configured to send and receive packets via the router 112. As a coprocessor to the processing engines 120 within the same cluster 110, although not shown in FIG. 3A, the AIP 114 may also be coupled to each processing engines 120 within the same cluster 110 directly. In one embodiment, a bus shared by all the processing engines 120 within the same cluster 110 may be used for communication between the AIP 114 and all the processing engines 120 within the same cluster 110. In another embodiment, a multiplexer may be used to control communication between the AIP 114 and all the processing engines 120 within the same cluster 110. In yet another embodiment, a multiplexer may be used to control access to the bus shared by all the processing engines 120 within the same cluster 110 for communication with the AIP 114.

Figure 3B:
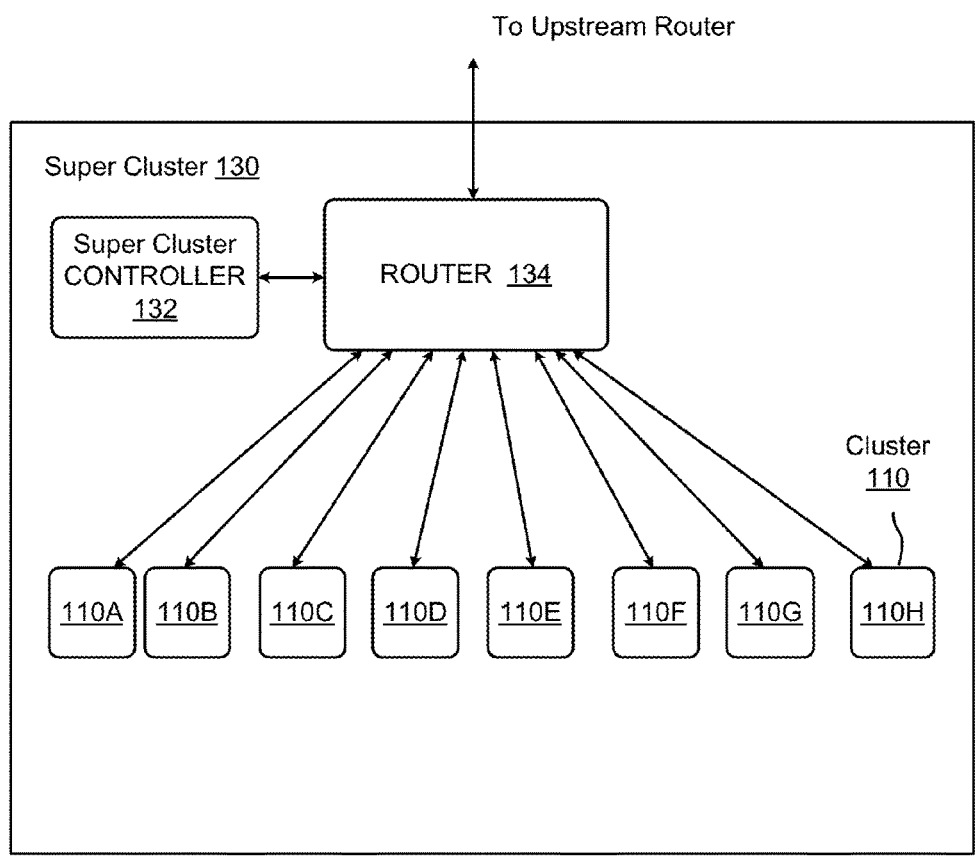
FIG. 3B is a block diagram of an exemplary super cluster according to the present disclosure.

The grouping of the processing engines 120 on a computing device 102 may have a hierarchy with multiple levels. For example, multiple clusters 110 may be grouped together to form a super cluster. FIG. 3B is a block diagram of an exemplary super cluster 130 according to the present disclosure. As shown on FIG. 3B, a plurality of clusters 110A through 110H may be grouped into an exemplary super cluster 130. Although 8 clusters are shown in the exemplary super cluster 130 on FIG. 3B, the exemplary super cluster 130 may comprise 2, 4, 8, 16, 32 or another number of clusters 110. The exemplary super cluster 130 may comprise a router 134 and a super cluster controller 132, in addition to the plurality of clusters 110. The router 134 may be configured to route packets among the clusters 110 and the super cluster controller 132 within the super cluster 130, and to and from resources outside the super cluster 130 via a link to an upstream router. In an embodiment in which the super cluster 130 may be used in a processing device 102A, the upstream router for the router 134 may be the top level router 104 of the processing device 102A and the router 134 may be an upstream router for the router 112 within the cluster 110. In one embodiment, the super cluster controller 132 may implement CCRs, may be configured to receive and send packets, and may implement a fixed-purpose state machine encapsulating packets and memory access to the CCRs, and the super cluster controller 132 may be implemented similar to the cluster controller 116. In another embodiment, the super cluster 130 may be implemented with just the router 134 and may not have a super cluster controller 132.

An exemplary cluster 110 according to the present disclosure may include 2, 4, 8, 16, 32 or another number of processing engines 120. FIG. 3A shows an example of a plurality of processing engines 120 that have been grouped into a cluster 110 and FIG. 3B shows an example of a plurality of clusters 110 that have been grouped into a super cluster 130. Grouping of processing engines is not limited to clusters or super clusters. In one embodiment, more than two levels of grouping may be implemented and each level may have its own router and controller.

Figure 4:
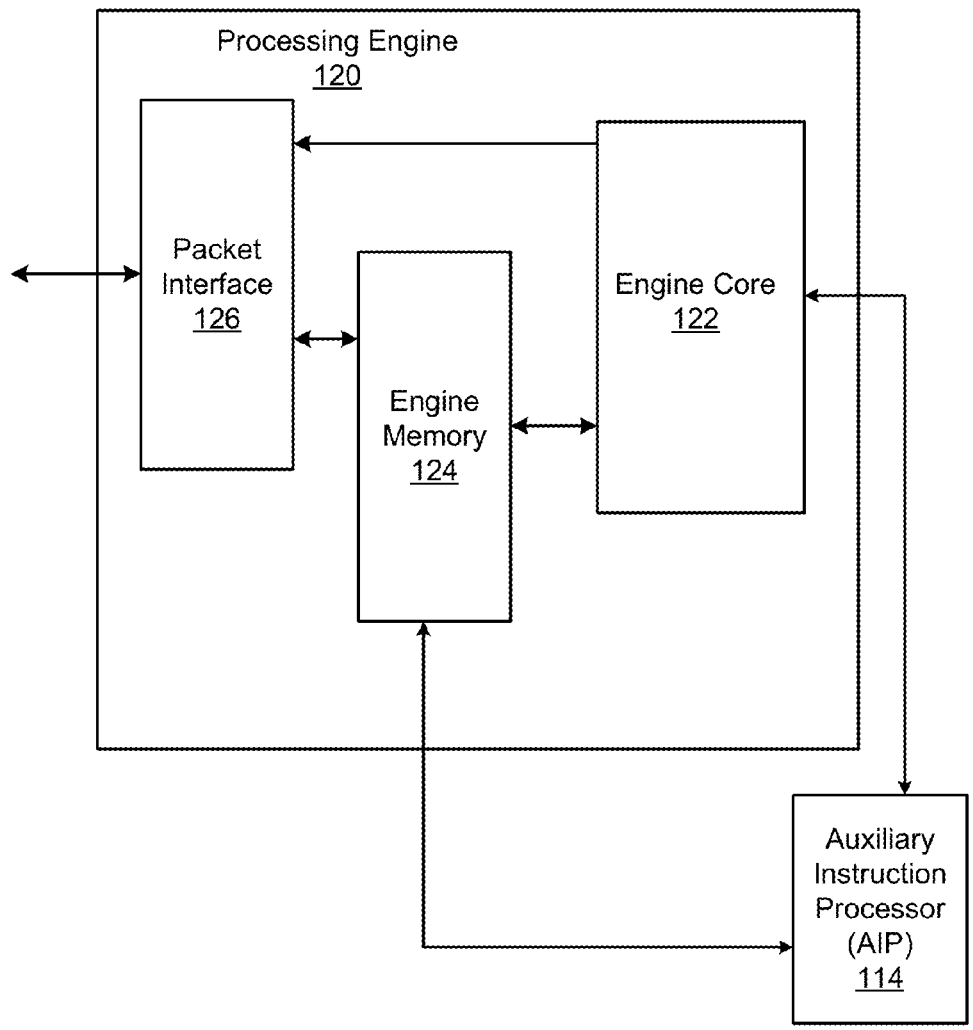
FIG. 4 is a block diagram of an exemplary processing engine according to the present disclosure.

FIG. 4 shows a block diagram of an exemplary processing engine 120 according to the present disclosure. As shown in FIG. 4, the processing engine 120 may comprise an engine core 122, an engine memory 124 and a packet interface 126.

The processing engine 120 may be coupled to an AIP 114. As described herein, the AIP 114 may be shared by all processing engines 120 within a cluster 110. The processing core 122 may be a central processing unit (CPU) with an instruction set and may implement some or all features of modern CPUs, such as, for example, a multi-stage instruction pipeline, one or more arithmetic logic units (ALUs), a floating point unit (FPU) or any other existing or future-developed CPU technology. The instruction set may comprise one instruction set for the ALU to perform arithmetic and logic operations, and another instruction set for the FPU to perform floating point operations. In one embodiment, the FPU may be a completely separate execution unit containing a multi-stage, single-precision floating point pipeline. When an FPU instruction reaches the instruction pipeline of the processing engine 120, the instruction and its source operand(s) may be dispatched to the FPU.

The instructions of the instruction set may implement the arithmetic and logic operations and the floating point operations, such as those in the INTEL® x86 instruction set, using a syntax similar or different from the x86 instructions. In some embodiments, the instruction set may include customized instructions. For example, one or more instructions may be implemented according to the features of the computing system 100. In one example, one or more instructions may cause the processing engine executing the instructions to generate packets directly with system wide addressing. In another example, one or more instructions may have a memory address located anywhere in the computing system 100 as an operand. In such an example, a memory controller of the processing engine executing the instruction may generate packets according to the memory address being accessed.

The engine memory 124 may comprise a program memory, a register file comprising one or more general purpose registers, one or more special registers and one or more events registers. The program memory may be a physical memory for storing instructions to be executed by the processing core 122 and data to be operated upon by the instructions. In some embodiments, portions of the program memory may be disabled and powered down for energy savings. For example, a top half or a bottom half of the program memory may be disabled to save energy when executing a program small enough that less than half of the storage may be needed. The size of the program memory may be 1 thousand (1K), 2K, 3K, 4K, or any other number of storage units. The register file may comprise 128, 256, 512, 1024, or any other number of storage units. In one non-limiting example, the storage unit may be 32-bit wide, which may be referred to as a longword, and the program memory may comprise 2K 32-bit longwords and the register file may comprise 256 32-bit registers.

The register file may comprise one or more general purpose registers for the processing core 122. The general purpose registers may serve functions that are similar or identical to the general purpose registers of an x86 architecture CPU.

The special registers may be used for configuration, control and/or status. Exemplary special registers may include one or more of the following registers: a program counter, which may be used to point to the program memory address where the next instruction to be executed by the processing core 122 is stored; and a device identifier (DEVID) register storing the DEVID of the processing device 102.

In one exemplary embodiment, the register file may be implemented in two banks—one bank for odd addresses and one bank for even addresses—to permit fast access during operand fetching and storing. The even and odd banks may be selected based on the least-significant bit of the register address for if the computing system 100 is implemented in little endian or on the most-significant bit of the register address if the computing system 100 is implemented in big-endian.

The engine memory 124 may be part of the addressable memory space of the computing system 100. That is, any storage location of the program memory, any general purpose register of the register file, any special register of the plurality of special registers and any event register of the plurality of events registers may be assigned a memory address PADDR. Each processing engine 120 on a processing device 102 may be assigned an engine identifier (ENGINE ID), therefore, to access the engine memory 124, any addressable location of the engine memory 124 may be addressed by DEVID:CLSID:ENGINE ID: PADDR. In one embodiment, a packet addressed to an engine level memory location may include an address formed as DEVID:CLSID: ENGINE ID: EVENTS:PADDR, in which EVENTS may be one or more bits to set event flags in the destination processing engine 120. It should be noted that when the address is formed as such, the events need not form part of the physical address, which is still DEVID:CLSID:ENGINE ID:PADDR. In this form, the events bits may identify one or more event registers to be set but these events bits may be separate from the physical address being accessed.

The packet interface 126 may comprise a communication port for communicating packets of data. The communication port may be coupled to the router 112 and the cluster memory 118 of the local cluster. For any received packets, the packet interface 126 may directly pass them through to the engine memory 124. In some embodiments, a processing device 102 may implement two mechanisms to send a data packet to a processing engine 120. For example, a first mechanism may use a data packet with a read or write packet opcode. This data packet may be delivered to the packet interface 126 and handled by the packet interface 126 according to the packet opcode. The packet interface 126 may comprise a buffer to hold a plurality of storage units, for example, 1K, 2K, 4K, or 8K or any other number. In a second mechanism, the engine memory 124 may further comprise a register region to provide a write-only, inbound data interface, which may be referred to a mailbox. In one embodiment, the mailbox may comprise two storage units that each can hold one packet at a time. The processing engine 120 may have a event flag, which may be set when a packet has arrived at the mailbox to alert the processing engine 120 to retrieve and process the arrived packet. When this packet is being processed, another packet may be received in the other storage unit but any subsequent packets may be buffered at the sender, for example, the router 112 or the cluster memory 118, or any intermediate buffers.

In various embodiments, data request and delivery between different computing resources of the computing system 100 may be implemented by packets. FIG. 5 illustrates a block diagram of an exemplary packet 140 according to the present disclosure. As shown in FIG. 5, the packet 140 may comprise a header 142 and an optional payload 144. The header 142 may comprise a single address field, a packet opcode (POP) field and a size field. The single address field may indicate the address of the destination computing resource of the packet, which may be, for example, an address at a device controller level such as DEVID:PADDR, an address at a cluster level such as a physical address DEVID:CLSID:PADDR or a virtual address DEVID:CLSID:ADDR, or an address at a processing engine level such as DEVID:CLSID:ENGINE ID:PADDR or DEVID:CLSID:ENGINE ID:EVENTS: PADDR. The POP field may include a code to indicate an operation to be performed by the destination computing resource. Exemplary operations in the POP field may include read (to read data from the destination) and write (to write data (e.g., in the payload 144) to the destination).

In some embodiments, the exemplary operations in the POP field may further include bulk data transfer. For example, certain computing resources may implement a direct memory access (DMA) feature. Exemplary computing resources that implement DMA may include a cluster memory controller of each cluster memory 118, a memory controller of each engine memory 124, and a memory controller of each device controller 106. Any two computing resources that implemented the DMA may perform bulk data transfer between them using packets with a packet opcode for bulk data transfer.

In addition to bulk data transfer, in some embodiments, the exemplary operations in the POP field may further include transmission of unsolicited data. For example, any computing resource may generate a status report or incur an error during operation, the status or error may be reported to a destination using a packet with a packet opcode indicating that the payload 144 contains the source computing resource and the status or error data.

The POP field may be 2, 3, 4, 5 or any other number of bits wide. In some embodiments, the width of the POP field may be selected depending on the number of operations defined for packets in the computing system 100. Also, in some embodiments, a packet opcode value can have different meaning based on the type of the destination computer resources that receives it. By way of example and not limitation, for a three-bit POP field, a value 001 may be defined as a read operation for a processing engine 120 but a write operation for a cluster memory 118.

In some embodiments, the header 142 may further comprise an addressing mode field and an addressing level field. The addressing mode field may contain a value to indicate whether the single address field contains a physical address or a virtual address that may need to be converted to a physical address at a destination. The addressing level field may contain a value to indicate whether the destination is at a device, cluster memory or processing engine level.

The payload 144 of the packet 140 is optional. If a particular packet 140 does not include a payload 144, the size field of the header 142 may have a value of zero. In some embodiments, the payload 144 of the packet 140 may contain a return address. For example, if a packet is a read request, the return address for any data to be read may be contained in the payload 144.

Figure 6:
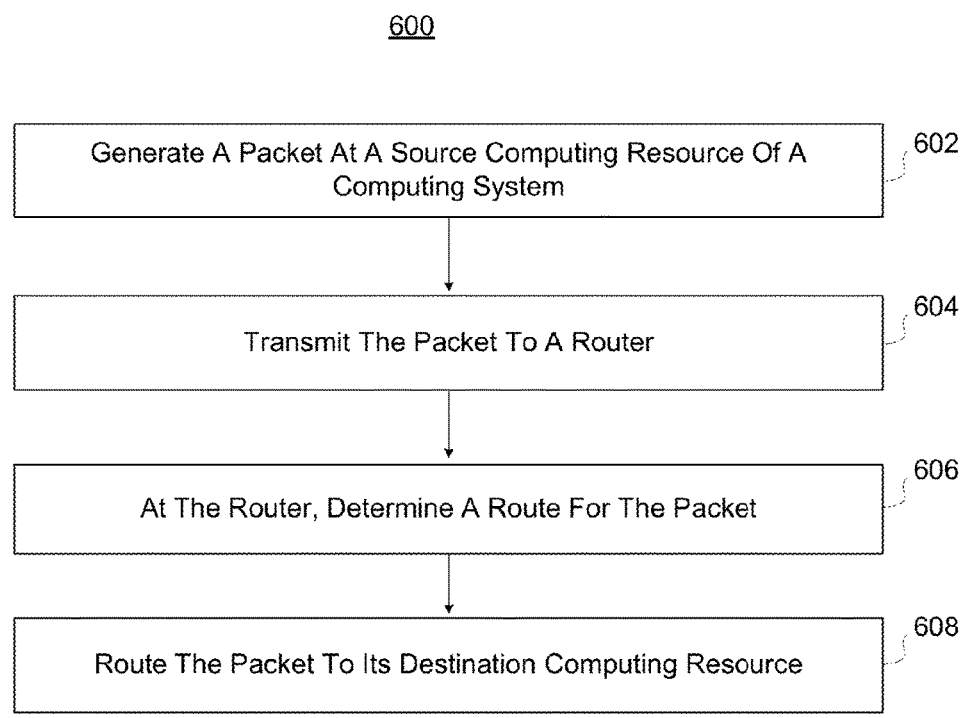
FIG. 6 is a flow diagram showing an exemplary process of addressing a computing resource using a packet according to the present disclosure.

FIG. 6 is a flow diagram showing an exemplary process 200 of addressing a computing resource using a packet according to the present disclosure. An exemplary embodiment of the computing system 100 may have one or more processing devices configured to execute some or all of the operations of exemplary process 600 in response to instructions stored electronically on an electronic storage medium. The one or more processing devices may include one or more devices configured through hardware, firmware, and/or software to be specifically designed for execution of one or more of the operations of exemplary process 600.

The exemplary process 600 may start with block 602, at which a packet may be generated at a source computing resource of the exemplary embodiment of the computing system 100. The source computing resource may be, for example, a device controller 106, a cluster controller 118, a super cluster controller 132 if super cluster is implemented, an AIP 114, a memory controller for a cluster memory 118, or a processing engine 120. The generated packet may be an exemplary embodiment of the packet 140 according to the present disclosure. From block 602, the exemplary process 600 may continue to the block 604, where the packet may be transmitted to an appropriate router based on the source computing resource that generated the packet. For example, if the source computing resource is a device controller 106, the generated packet may be transmitted to a top level router 104 of the local processing device 102; if the source computing resource is a cluster controller 116, the generated packet may be transmitted to a router 112 of the local cluster 110; if the source computing resource is a memory controller of the cluster memory 118, the generated packet may be transmitted to a router 112 of the local cluster 110, or a router downstream of the router 112 if there are multiple cluster memories 118 coupled together by the router downstream of the router 112; and if the source computing resource is a processing engine 120, the generated packet may be transmitted to a router of the local cluster 110 if the destination is outside the local cluster and to a memory controller of the cluster memory 118 of the local cluster 110 if the destination is within the local cluster.

At block 606, a route for the generated packet may be determined at the router. As described herein, the generated packet may comprise a header that includes a single destination address. The single destination address may be any addressable location of a uniform memory space of the computing system 100. The uniform memory space may be an addressable space that covers all memories and registers for each device controller, cluster controller, super cluster controller if super cluster is implemented, cluster memory and processing engine of the computing system 100. In some embodiments, the addressable location may be part of a destination computing resource of the computing system 100. The destination computing resource may be, for example, another device controller 106, another cluster controller 118, a memory controller for another cluster memory 118, or another processing engine 120, which is different from the source computing resource. The router that received the generated packet may determine the route for the generated packet based on the single destination address. At block 608, the generated packet may be routed to its destination computing resource.

Figure 7:
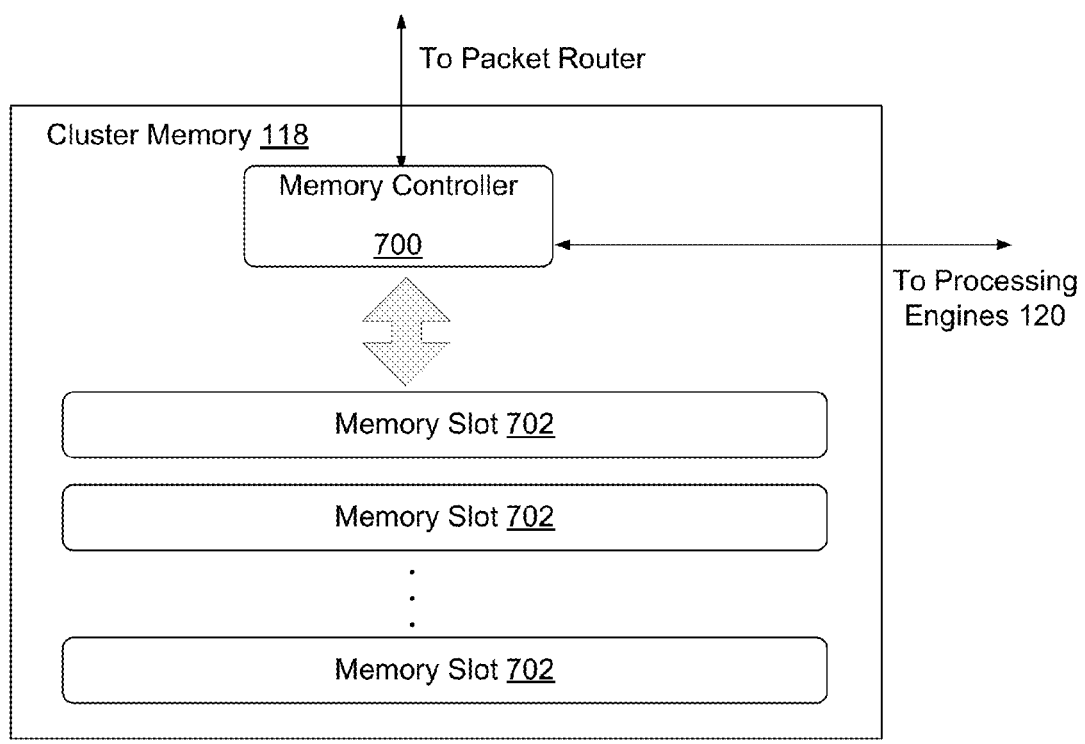
FIG. 7 is a block diagram of an exemplary cluster memory according to the present disclosure.

FIG. 7 is a block diagram of an exemplary cluster memory 118 according to the present disclosure. The exemplary cluster memory 118 may comprise a memory controller 700 and a plurality of memory slots 702. The memory controller 700 may also be referred to as a cluster memory controller to distinguish it from other memory controllers in a processing device 102; for example, a memory controller for a processing engine 120, or a memory controller for a device controller 106.

As shown in FIG. 7, the memory controller 700 may be coupled to a packet router and to processing engines 120 via different data links. In an embodiment that has one cluster memory 118 within a cluster 110, the memory controller 700 may be coupled to the router 112 of the cluster 110. The memory controller 700 may also be referred to as a smart memory controller because it may implement two different access protocols: by packet access and direct memory access.

In one embodiment, the data link between the memory controller 700 and a router may be a packet-based data communication and the data link between the memory controller 700 and processing engines 120 may be a direct data communication. The packet-based data communication may use packets according to the present disclosure, such as the exemplary packet 140 shown in FIG. 5. The processing engines 120 coupled to the memory controller 700 may be the plurality of processing engines 120 within the same cluster 110 and the direct data communication may be existing or future-developed memory access technologies. Non-limiting examples of existing memory access technologies that may be used for the direct data communication between the memory controller 700 and the plurality of processing engines 120 within the cluster 110 may include bus, crossbar, or any other existing memory access techniques for a network on a chip architecture.

The memory slots 702 may be slots configured to receive memory banks and may be configured for any existing or future-developed memories such as, but not limited to, synchronous dynamic random-access memory (SDRAM), double data rate (DDR) SDRAM, DDR2 SDRAM, DDR3 SDRAM, or 3D RAM.

Figure 8A:
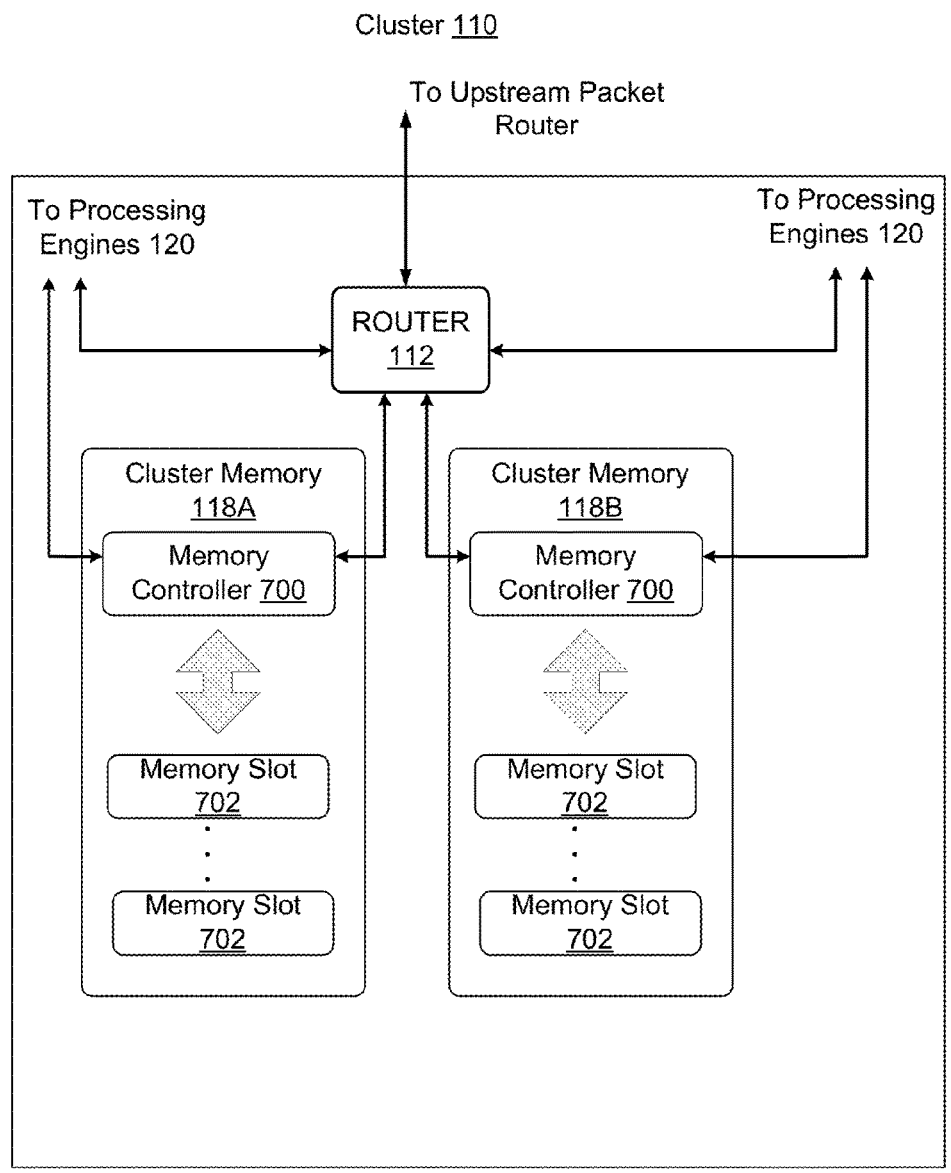
FIG. 8A is a block diagram of an exemplary cluster having a plurality of cluster memories according to the present disclosure.

FIG. 8A is a block diagram of an exemplary cluster 110 having a plurality of cluster memories 118 according to the present disclosure. As shown on FIG. 8A, the exemplary cluster 110 may comprise a cluster memory 118A having a memory controller 700 coupled to the router 112 of the exemplary cluster 110 and a cluster memory 118B also having a memory controller 700 coupled to the router 112 of the exemplary cluster 110. Each of the cluster memories 118A and 118B may be one exemplary cluster memory 118 as described herein but need not be identical. In an embodiment, the cluster memories 118A and 118B may be identical, for example, both configured to use DDR2 SDRAM or DDR3 SDRAM. In another embodiment, the cluster memories 118A and 118B may be different, for example, one configured to use DDR2 SDRAM but another configured to use 3D RAM.

Figure 8B:
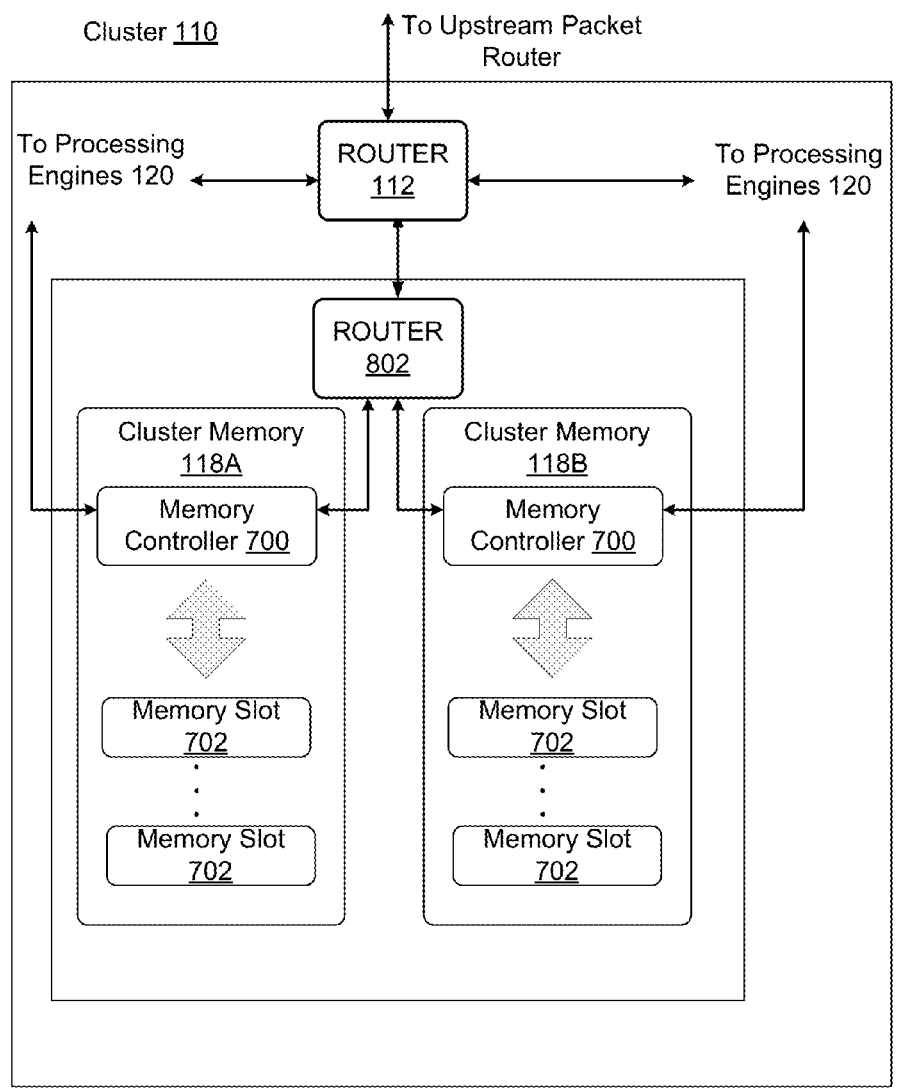
FIG. 8B is a block diagram of another exemplary cluster having a plurality of cluster memories according to the present disclosure.

FIG. 8B is a block diagram of another exemplary cluster 110 that may have two cluster memories 118A and 118B as those shown in FIG. 8A. In contrast to FIG. 8A, regardless of whether they are identical, the cluster memories 118A and 118B in the exemplary embodiment cluster 110 shown in FIG. 8B may be both coupled to a router 802 for packet-based data communication and coupled to the processing engines 120 within the cluster 110 for direct data communication. The router 802 may be coupled to an upstream router, such as the router 112 for the cluster 110. As used herein, downstream may refer to the direction from the top level router 104 to the router 134 (if super clusters are implemented), to the router 112, and then to the router 802 (if such a router is implemented), and upstream may be the reverse direction of downstream.

Although 2 cluster memories 118 are shown in the exemplary clusters 110 on FIGS. 8A and 8B, an exemplary cluster 110 may comprise 3, 4, 5, 6 or another number of cluster memories 118. When an exemplary cluster 110 comprises three or more cluster memories 118, the cluster memories 188 may be comprised of any combination of matching different types of memories (e.g., all of the same type, all of different types, some of the same type, or some of different types).

Although the processing engines 120 may access a cluster memory 118 within the same cluster 110 directly via direct data communication, in one embodiment, one or more processing engines 120 may send packets to the router 112 for data access and the router 112 may send the packets (via an optional downstream router, such as the router 802 if such a router is implemented) to the cluster memory 118 within the same cluster 110. Thus, in this embodiment, the cluster memory 118 may be accessed by the processing engines 120 within the same cluster 110 by both packet-based communication and direct data communication. It should be noted that the memory controller 700 is not limited to being a memory controller for a memory inside a cluster 110. In one embodiment, a memory with a memory controller 700 may provide direct memory access to all processing engines in a super cluster 130 or all processing engines in a processing device 102. Regardless of the scope of sharing of the memory, the memory controller 700 may provide two access mechanisms: direct data communication (e.g., direct memory access) for all processing engines 120 and the AIP 114 sharing the memory directly; and packet-based communication for all computing resources within an exemplary system 100 that may be configured to generate, transmit and receive packets, including but not limited to, any processing engines 120 (including the processing engines 120 that already have direct access to the memory), device controllers 106, top level routers 104, the host, routers 112, AIPs 114, cluster controllers 116, super cluster controllers 132, routers 134 and/or routers 802.

Figure 9:
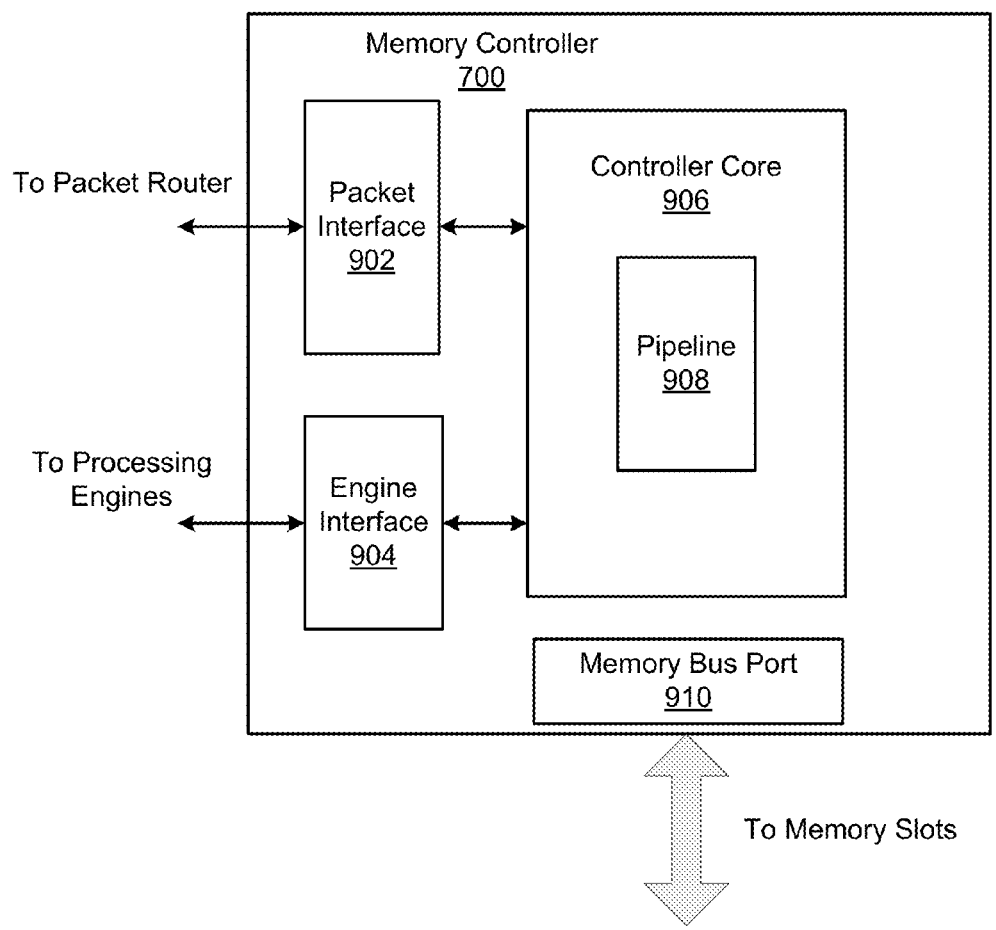
FIG. 9 is a block diagram of an exemplary memory controller for a cluster memory according to the present disclosure.

FIG. 9 is a block diagram of an exemplary memory controller 700 for a cluster memory 118 according to the present disclosure. The exemplary memory controller 700 shown in FIG. 9 may comprise a packet interface 902, an engine interface 904, a controller core 906 and a memory bus port 910. The engine interface 904 may be configured to support direct memory access by the processing engines 120 within the cluster 110. As such, the engine interface 904 may implement part or all features of existing or future-developed memory access technologies, such as but not limited to include bus, crossbar, or any other existing memory access techniques for a network on a chip architecture. The packet interface 902 may comprise hardware components configured to receive and transmit packets to a router. In one non-limiting embodiment, the packet interface 902 may comprise a queue to buffer received packets and another queue to buffer packets to be sent. Once a packet is received at the packet interface 902, it may be forwarded to the controller core 906 for processing. The memory bus port 910 may be a data connection port configured to couple the memory controller 700 to the memory slots 702.

The controller core 902 may be configured to decode a received packet, perform the memory operation (if required by the packet opcode), and generate a result packet (if necessary). For example, if a received packet has a packet opcode for a memory write, the controller core 902 may extract data from the received packet and write the data to the memory bank at an address specified in the packet. Likewise, if a received packet has a packet opcode for a memory read, the controller core 902 may read data from the memory address specified in the packet, place the data in a new packet with a destination address specified in the read packet, and send the new packet to the packet interface 902 to be queued for transmission. In one embodiment, the controller core 902 may have a structure similar to a typical CPU. For example, the controller core 902 may comprise an optional pipeline 908 to perform the steps of decoding the packet, performing the memory operation, and generating a result packet.

Figure 10:
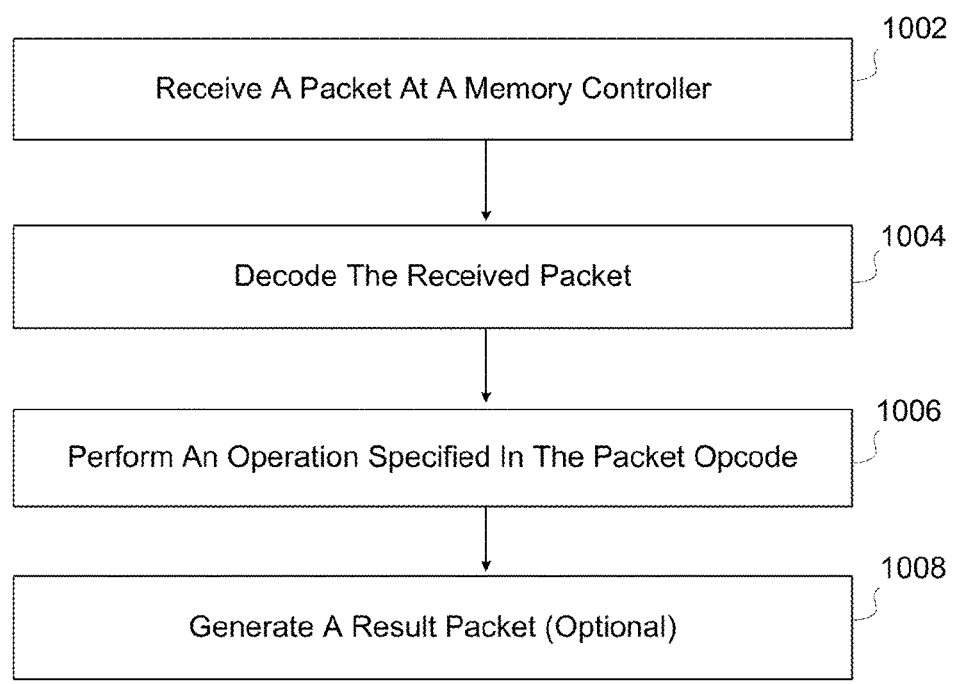
FIG. 10 is a flow diagram showing an exemplary process of processing a packet at a memory controller according to the present disclosure.

FIG. 10 is a flow diagram showing an exemplary process 1000 of processing a packet at a memory controller 700 according to the present disclosure. An exemplary memory controller 700 may be configured through hardware, firmware, or combination thereof to execute one or more operations of exemplary process 1000. In one non-limiting example, an exemplary memory controller 700 may be configured to execute some or all of the operations of exemplary process 1000 in accordance to instructions stored electronically on an electronic storage medium.

The exemplary process 1000 may start with block 1002, at which a packet may be received at a memory controller 700. For example, the memory controller 700 may be a memory controller of a cluster memory 118 and comprise two interfaces, one of which may be configured to support direct memory access by a plurality of processing engines 120 and another of which may be configured to support access to memory by packets. As described herein, the packets may be received from all computing resources with an exemplary computing system 100. The non-exclusive computing resources that may send packets to access memory may include any processing engines 120, device controllers 106, top level routers 104, the host, routers 112, AIPs 114, cluster controllers 116, super cluster controllers 132, routers 134 and/or routers 802.

At block 1004, the received packet may be decoded by the memory controller 700. As described herein, the packet (for example, an exemplary packet 140) may comprise a header that contains an address to be accessed and a packet opcode. The memory controller 700 may determine an operation to be performed in accordance with the packet opcode and determine an address within the cluster memory 118 during the decoding process. At block 1006, the operation specified in the packet opcode may be performed. For example, if the specified operation is a memory read, the memory controller 700 may read data from the determined address within the cluster memory 118 and if the specified operation is a memory write, a payload from the received packet may be written to the determined address within the cluster memory 118. At optional block 1008, a result packet may be generated. Some packets may contain packet opcodes specifying operations that don't need a response but some packets may contain packet opcodes specifying operations that need a response. For example, a packet opcode specifying a write operation may not need a response but a packet opcode specifying a read operation may need a response. In one embodiment, if the packet opcode specifies a read operation, a return packet may be generated with the return address obtained from the payload of the received packet and the payload of the return packet may be data read from the determined address within the cluster memory 118.

While specific embodiments and applications of the present invention have been illustrated and described, it is to be understood that the invention is not limited to the precise configuration and components disclosed herein. The terms, descriptions and figures used herein are set forth by way of illustration only and are not meant as limitations. Various modifications, changes, and variations which will be apparent to those skilled in the art may be made in the arrangement, operation, and details of the apparatuses, methods and systems of the present invention disclosed herein without departing from the spirit and scope of the invention. By way of non-limiting example, it will be understood that the block diagrams included herein are intended to show a selected subset of the components of each apparatus and system, and each pictured apparatus and system may include other components which are not shown on the drawings. Additionally, those with ordinary skill in the art will recognize that certain steps and functionalities described herein may be omitted or re-ordered without detracting from the scope or performance of the embodiments described herein.

The various illustrative logical blocks, modules, circuits, and algorithm steps described in connection with the embodiments disclosed herein may be implemented as electronic hardware, computer software, or combinations of both. To illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality can be implemented in varying ways for each particular application— such as by using any combination of microprocessors, microcontrollers, field programmable gate arrays (FPGAs), application specific integrated circuits (ASICs), and/or System on a Chip (SoC)—but such implementation decisions should not be interpreted as causing a departure from the scope of the present invention.

The steps of a method or algorithm described in connection with the embodiments disclosed herein may be embodied directly in hardware, in a software module executed by a processor, or in a combination of the two. A software module may reside in RAM, flash memory, ROM, EPROM, EEPROM, registers, hard disk, a removable disk, a CD-ROM, or any other form of storage medium known in the art.

The methods disclosed herein comprise one or more steps or actions for achieving the described method. The method steps and/or actions may be interchanged with one another without departing from the scope of the present invention. In other words, unless a specific order of steps or actions is required for proper operation of the embodiment, the order and/or use of specific steps and/or actions may be modified without departing from the scope of the present invention.

What is claimed is:

1. A memory controller, comprising:
   a memory bus port to be coupled to a plurality of memory slots that are configured to receive memory banks to form a memory associated with the memory controller;
   a first interface to transmit and receive packets for the memory, each of the packets comprising a header, the header containing a mutable address and a packet opcode specifying an operation to be performed in accordance with a network protocol;
   a second interface to be coupled to a plurality of processing engines to provide the plurality of processing engines direct access to the memory; and
   a controller core configured to:
     decode a packet received at the first interface; and
     perform an operation specified in the received packet.

2. The memory controller of claim 1, wherein the memory controller and the memory are located on a processing device, the processing device includes a plurality of clusters of processing engines, the network protocol specifies that the mutable address includes a device identifier for the processing device, a cluster identifier for a cluster in which the memory controller is located, and a memory address pointing to a memory location in the memory associated with the memory controller.

3. The memory controller of claim 2, wherein the packet opcode in the received packet specifies a read operation, and the network protocol specifies that for a read operation the received packet contains a payload that contains a return address, to perform the operation specified in the received packet, the controller core is further configured to:
   read data from the memory address contained within the received packet,
   place the data in a new packet with a destination address contained within the received packet; and
   send the new packet to the first interface to be queued for transmission.

4. The memory controller of claim 2, wherein the packet opcode in the received packet specifies a write operation, and the network protocol specifies that for a write operation the received packet contains a payload that contains payload data to be written to the memory, and to perform the operation specified in the received packet, the controller core is further configured to write the payload data to the memory location.

5. The memory controller of claim 2, wherein the packets are received from one or more of a plurality of computing resources including a device controller for the processing device, cluster controllers for all clusters on the processing device, all other memory controllers of the processing device, and all processing engines on the processing device in other clusters.

6. The memory controller of claim 2, wherein the processing device is one of a plurality of computing devices in a computing system, and the packets are received from one or more of other computing devices in the computing system.

7. The memory controller of claim 2, wherein the first interface is configured to support memory access by the plurality of processing engines within the cluster in which the memory controller is located via packet data communication.

8. A processing device, comprising
   a plurality of processing engines;
   a memory comprising a plurality of memory slots that are configured to receive memory banks; and
   a memory controller associated with the memory, the memory controller including:
     a memory bus port coupled to the plurality of memory slots;
     a first interface to transmit and receive packets for the memory, each of the packets comprising a header, the header containing a mutable address and a packet opcode specifying an operation to be performed in accordance with a network protocol;
     a second interface coupled to the plurality of processing engines to provide the plurality of processing engines direct access to the memory; and
     a controller core configured to:
       decode a packet received at the first interface; and
       perform an operation specified in the received packet.

9. The processing device of claim 8, wherein the processing device includes a plurality of clusters of processing engines, the network protocol specifies that the mutable address includes a device identifier for the processing device, a cluster identifier for the cluster in which the memory controller is located, and a memory address pointing to a memory location in the memory associated with the memory controller.

10. The processing device of claim 9, wherein the packet opcode in the received packet specifies a read operation, and the network protocol specifies that for a read operation the received packet contains a payload that contains a return address, to perform the operation specified in the received packet, the controller core is further configured to:
   read data from the memory address contained within the received packet,
   place the data in a new packet with a destination address contained within the received packet; and
   send the new packet to the first interface to be queued for transmission.

11. The processing device of claim 9, wherein the packet opcode in the received packet specifies a write operation, and the network protocol specifies that for a write operation the received packet contains a payload that contains payload data to be written to memory, and to perform the operation specified in the received packet, the controller core is further configured to write the payload data to the memory location.

12. The processing device of claim 9, wherein the first interface is also configured to support memory access by the plurality of processing engines within the cluster in which the memory controller is located via packet data communication.

13. The processing device of claim 8, wherein the packets are received from one or more of other computing devices in a computing system in which the processing device is a part.

14. A method for operating a memory controller on a processing device containing a plurality of computing resources, comprising:
  receiving a packet on a first interface of the memory controller, the first interface being configured to transmit and receive packets each comprising a header, the header containing a routable address and a packet opcode specifying an operation to be performed in accordance with a network protocol;
  decoding the received packet to determine a memory address to be accessed and an operation specified in the received packet, wherein the memory address points to a memory location in a memory associated with the memory controller and the operation is specified by the packet opcode;
  performing the operation specified in the received packet to access the memory associated with the memory controller; and
  receiving memory access requests on a second interface from a plurality of processing engines within a cluster in which the memory controller is located, the second interface being configured to provide direct memory access to the plurality of processing engines within the cluster in which the memory controller is located.

15. The method of claim 14, wherein the network protocol specifies that the mutable address includes a device identifier for the processing device, a cluster identifier for a cluster in which the memory is located, and the memory address to be accessed.

16. The method of claim 15, wherein the packet opcode in the received packet specifies a read operation, and the network protocol specifies that for a read operation the received packet contains a payload that contains a return address, and performing the operation specified in the received packet further comprises:
  reading data from the memory address contained within the received packet,
  placing the data in a new packet with a destination address contained within the received packet; and
  send the new packet to the first interface to be queued for transmission.

17. The method of claim 15, wherein the packet opcode in the received packet specifies a write operation, and the network protocol specifies that for a write operation the received packet contains a payload that contains payload data to be written to memory, and performing the operation specified in the received packet further comprising writing the payload data to the memory location.

18. The method of claim 15, wherein the packets are received from a plurality of computing resources including a device controller for the processing device, cluster controllers for all clusters on the processing device, all other memory controllers of the processing device, and all processing engines on the processing device in other clusters.

19. The method of claim 18, further comprising receiving memory access packets on the first interface from the plurality of processing engines within the cluster in which the memory controller is located.

20. The method of claim 14, further comprising processing the received packets in a pipeline.

* * * * *